W. LUYKEN.
DIRECT CURRENT DYNAMO MACHINE.
APPLICATION FILED DEC. 5, 1910.
1,139,201.
Patented May 11, 1915.
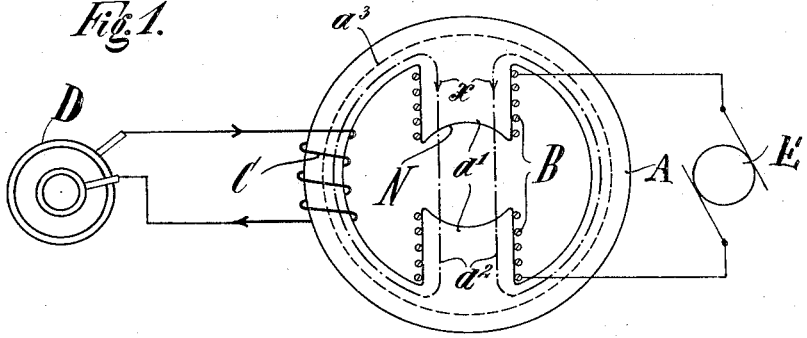
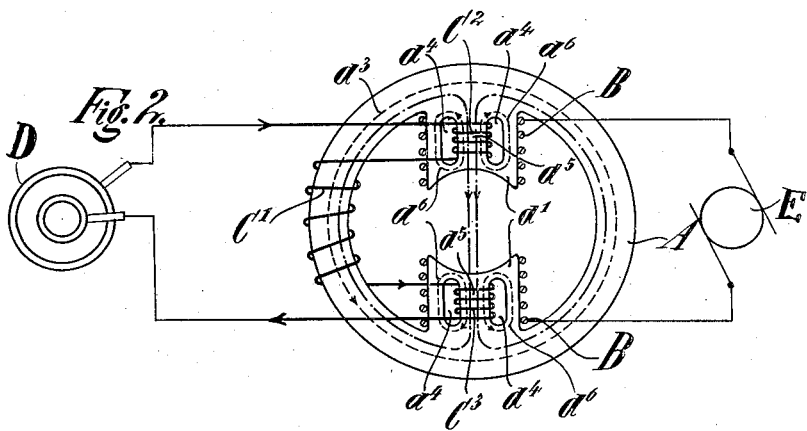

UNITED STATES PATENT OFFICE.

WILHELM LUYKEN, OF ESSEN-ON-THE-RUHR, GERMANY, ASSIGNOR TO FRIED. KRUPP AKTIENGESELLSCHAFT, OF ESSEN-ON-THE-RUHR, GERMANY.

DIRECT-CURRENT DYNAMO-MACHINE.

1,139,201.   Specification of Letters Patent.   Patented May 11, 1915.

Application filed December 5, 1910. Serial No. 595,703.

*To all whom it may concern:*

Be it known that I, WILHELM LUYKEN, a subject of the Emperor of Germany, and a resident of Essen-on-the-Ruhr, Germany, have invented certain new and useful Improvements in Direct-Current Dynamo-Machines, of which the following is a specification.

This invention relates to direct current dynamo machines having a secondary winding on the magnet-frame, which winding is charged from an alternating current source; and has for its object the prevention, as far as possible, of the creation of remanent or residual magnetism in the magnet-frame.

Two diagrammatical representations of the embodiment of the invention are shown in the drawing, the first embodiment in Figure 1, the second one in Fig. 2.

In the first embodiment of the invention, the magnet-frame is provided with two pole pieces $a^1$, situated diametrically opposite each other, and connected by an annular yoke A. The armature not shown in the drawing, is rotatably mounted between the pole pieces $a^1$, which latter are surrounded by a winding B, charged, when required, from a direct current source E, and having for its object the excitation of the dynamo machine. The yoke A is provided with a secondary winding C, arranged in the manner the drawing indicates, which winding may be charged from an alternating current source D, which is independent of the above mentioned direct current source. The strength of the alternating current, with which the winding C is charged is suited to generate a sufficiently strong flux in order to practically prevent the creating of any remanent magnetism in the magnet-frame.

In operating the machine, the flux, produced by the direct current running through the winding B, will be closed through the magnet-frame and the armature, as indicated by the dot and dash lines $a^2$, in Fig. 1, running in the direction of the arrow $x$ under the supposition that N is the north pole of the magnet-frame. The flux produced by the alternating current through the winding C, will flow substantially as indicated by the dotted line $a^3$, Fig. 1, around the annular yoke A, because this will be the path of least magnetic resistance. As then no flux, or at least an exceedingly small portion thereof, produced by the alternating current, will pass through the armature, the power field created by the alternating current has practically no influence on the uniformity of the flux produced by the direct current winding B, and passing through the armature. Similarly will the uniformity of tension in the direct current produced in the armature, not be affected by the alternating current flux.

The second embodiment of the invention, represented in Fig. 2 differs only in the following points from the first one. The secondary winding of the magnet-frame, charged with alternating current, consists here of three helices $C^1$, $C^2$ and $C^3$ connected in series, of which the first one ($C^1$), similarly to the alternating current winding in the first embodiment, is situated on the annular yoke A; while the two other helices $C^2$ and $C^3$ are placed, coaxially with the continuous current winding B, on the pole pieces $a^1$. With this object in view, two oblong openings $a^4$, lying side by side, are provided in the pole pieces $a^1$ as illustrated in the drawing, dividing each pole piece into three parallel strips, around the middle ones of which $a^5$ the helices $C^2$ and $C^3$ are wound. It is thus so arranged that poles of the same sign will be produced by the alternating current in the opposite ends of the pole pieces $a^1$. With the momentary direction of the currents as indicated by the arrows, they will consequently be south poles. The two embodiments agree in other respects. When the alternating current flows through the windings $C^1$, $C^2$, $C^3$, the part thereof that lies outside the pole pieces, that is the helix designated $C^1$ and corresponding to the helix C in the first embodiment of the invention; produces in similar manner a flux in the ring shaped yoke A, the course of which is indicated by the dotted line $a^3$. As poles of similar sign are always produced in the opposite ends of the pole pieces by the influence of the alternating currents flowing through the helices $C^2$ and $C^3$; the fluxes produced by the helices $C^2$ and $C^3$ have no tendency to enter the space intended for the armature. The latter fluxes will therefore, in the main, follow the path indicated by the dotted lines $a^6$ inside the pole piece, as this offers the least magnetic resistance. It will be perceived that also in this second embodiment of the invention, the object is attained of neutralizing the effect of the remanent magnetism, practically without injuring the uniformity of tension in the direct current inducted in the armature. A particular advantage of this embodiment is that no magnetic field of a disturbing magnitude can be produced in the pole pieces.

I claim:—

1. A separately excited direct current dynamo machine having a secondary winding on the magnet-frame adapted to be charged with alternating current, whereby to neutralize the remanent magnetism in the magnet-frame.

2. A separately excited direct current dynamo machine having a closed magnet frame provided with pole pieces and a secondary winding partly arranged on the pole pieces and partly on a portion of the frame therebetween, said winding being adapted to be charged with alternating current, whereby to neutralize the remanent magnetism in the magnet frame.

3. A separately excited direct current dynamo machine having a closed magnet frame provided with pole pieces and a secondary winding adapted to be charged with alternating current, whereby to neutralize the remanent magnetism in the magnetic frame, said winding comprising helices disposed on the pole pieces and wound to produce poles of the same sign in the ends of the pole pieces adjacent the armature.

4. A separately excited direct current dynamo machine having a closed magnet frame provided with pole pieces and a secondary winding adapted to be charged with alternating current, whereby to neutralize the remanent magnetism in the magnet frame, said pole pieces being divided into parallel strips and said winding comprising helices disposed on one strip of each pole piece and wound to produce poles of the same sign in the ends of the pole pieces adjacent the armature.

The foregoing specification signed at Barmen, Germany, this 4th day of November, 1910.

WILHELM LUYKEN. [L. S.]

In presence of—
  WALTER VONNEGUT,
  ALFRED HENKEL.